United States Patent [19]

Hamanaka

[11] Patent Number: 5,130,852
[45] Date of Patent: Jul. 14, 1992

[54] PLATE WITH LENS ARRAY

[75] Inventor: Kenjiro Hamanaka, Tsukuba, Japan

[73] Assignee: Nippon Sheet Glass Co., Ltd., Osaka, Japan

[21] Appl. No.: 655,339

[22] Filed: Feb. 13, 1991

Related U.S. Application Data

[62] Division of Ser. No. 554,729, Jul. 18, 1990, Pat. No. 5,074,649.

[30] Foreign Application Priority Data

Jul. 25, 1989 [JP] Japan .................................. 1-192160

[51] Int. Cl.$^5$ ............................................ G01J 1/08
[52] U.S. Cl. ................................... 359/741; 359/619
[58] Field of Search ............... 350/451, 413, 167, 452, 350/409; 250/203.2; 359/741, 742, 642, 652, 619

[56] References Cited

U.S. PATENT DOCUMENTS

| | | | |
|---|---|---|---|
| 4,428,647 | 1/1984 | Sprague et al. | 350/167 |
| 4,627,734 | 12/1986 | Rioux | 356/373 |
| 4,756,621 | 7/1988 | Sagara | 356/383 |
| 4,952,037 | 8/1990 | Oikawa et al. | 350/413 |

FOREIGN PATENT DOCUMENTS 0092912  4/1987  Japan ................................. 350/451

Primary Examiner—Janice A. Howell
Assistant Examiner—Richard Hanig
Attorney, Agent, or Firm—Herbert Dubno

[57] ABSTRACT

Disclosed is a plate with lens array comprising a transparent plate, and a plurality of gradient index lenses, at least two of which have different focal lengths, the lenses being linearly or two-dimensionally arranged in the transparent plate.

5 Claims, 3 Drawing Sheets

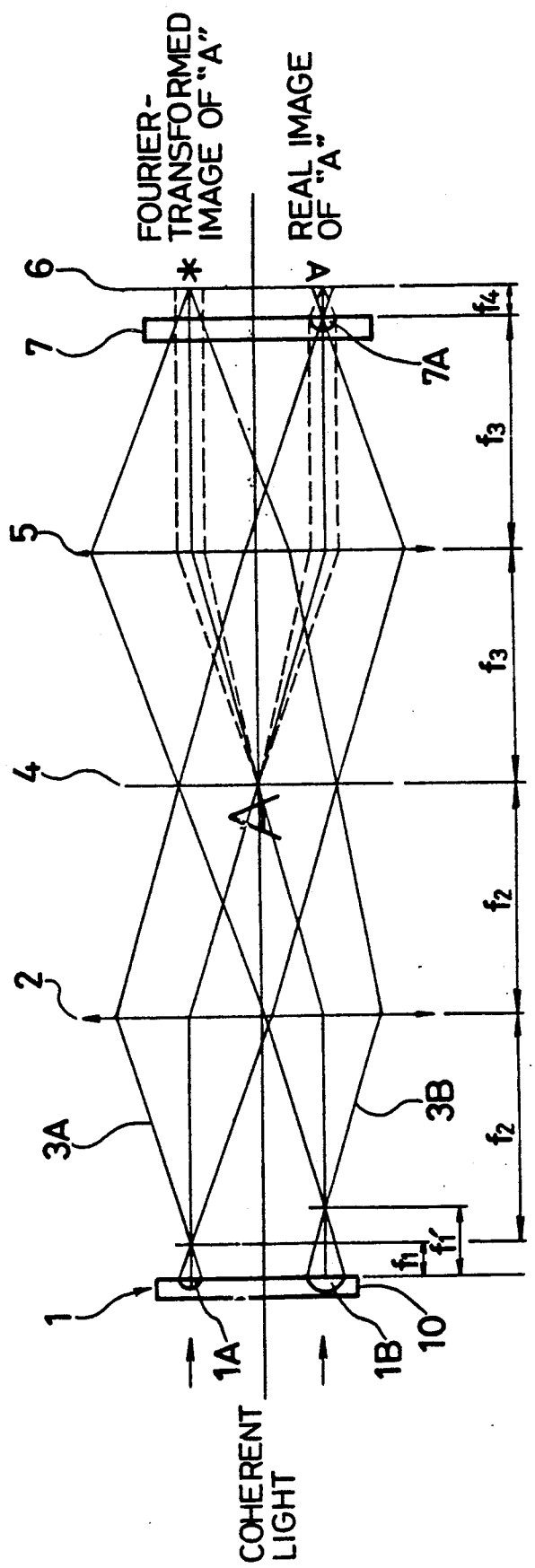

PLATE WITH LENS ARRAY

This is a divisional of co-pending application Ser. No. 07/554,729 filed on Jul. 18, 1990, now U.S. Pat. No. 5,074,649.

FIELD OF THE INVENTION

The present invention relates to a 501 plate with a lens array, in which a large number of small lenses are linearly or two-dimensionally arranged on a substrate formed of, e.g., glass or plastic, and to a plate with lens array which is suitably applied to a Fourier analyzer and a surface position/inclination sensor optical system.

BACKGROUND OF THE INVENTION

A conventional plate with a lens array is shown in FIG. 5. Reference may be had to commonly owned U.S. Pat. No. 4,952,037 issued on Ser. No. 07/317,079 filed Feb. 28, 1989 as a continuation of Ser. No. 119,249 filed Nov. 2, 1987 and a continuation in turn of Ser. No. 06/836,339 filed Mar. 5, 1986. Ser. No. 07/317,079 was divided to Ser. No. 07/398,182 of Aug. 24, 1989 of which a continuation Ser. No. 07/616,734 of Nov. 21, 1990 is copending herewith. As shown in FIG. 5, a conventional plate with lens array is constituted by arranging a large number of small gradient index lenses 12 in a glass plate 11. Each small lens 12 is defined by forming a semi-spherical gradient index region in which a refractive index is gradually decreased outwardly from the center to a portion near the surface of the glass plate 11. Each small lens 12 has a function of a convex lens for diffracting a light ray 13 by this gradient of the refractive index. The method of manufacturing the small lenses 12 will be described below. A metal mask is coated on a glass substrate, and mask openings are formed by photolithography at positions where the small lenses 12 are to be formed. The glass substrate is thus prepared with the metal mask on which a large number of openings are arrayed. The glass substrate is dipped into a molten salt containing ions at a high temperature for a predetermined time, the ions serving to relatively increase a refractive index of glass. In the molten salt is performed ion exchange between ions in the glass substrate and ions in the molten salt by thermal diffusion. As a result, a concentration distribution of ions introduced from the molten salt is formed in the glass substrate, and said semi-spherical gradient index regions are thereby formed in the glass substrate.

The plate with lens array on which the large number of small lenses 12 are arrayed can be used, e.g. for a coupling lens array between an LED array and an optical fiber array. However, since the conventional plate with the lens array is prepared so that all the small lenses 12 have the same focal length, its application is undesirably limited to some extent.

OBJECT OF THE INVENTION

It is accordingly an object of the present invention to provide an improved plate with lens array overcoming the above problem.

SUMMARY OF THE INVENTION

In order to achieve the above object of the present invention, there is provided a plate with a lens array comprising a substrate, and a plurality of lenses, at least two of which have different focal lengths, wherein the plurality of lenses are integrally arranged in the substrate so as to be linearly or two-dimensionally arrayed.

When a plate with lens array according to the present invention is used, various applications which are difficult to realize by the conventional plate with lens array can be very easily and precisely realized.

BRIEF DESCRIPTION OF THE DRAWINGS

The foregoing and other objective, features and advantages of the present invention will be more readily understood upon consideration of the following detailed description of certain preferred embodiments of the invention, taken in conjunction with the accompanying drawing, in which:

FIG. 3 is a diagram of an optical system as an application example of the plate with the lens array according to the present invention;

DETAILED DESCRIPTION OF THE PREFERRED EMBODIMENTS

An embodiment of the present invention will be described below with reference to FIGS. 1, 2A, and 2B.

Figure 1:
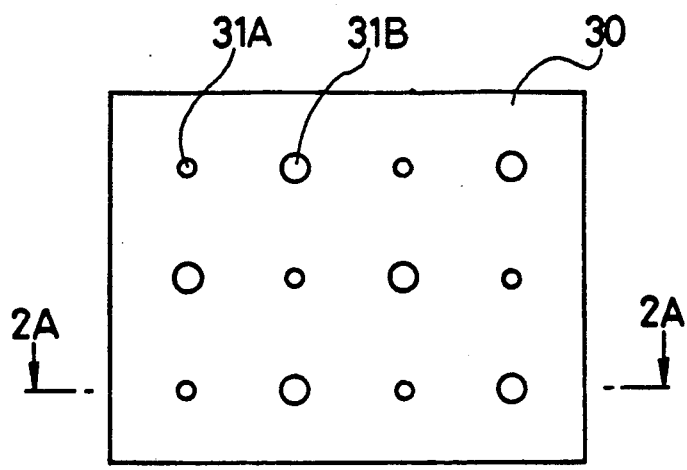
FIG. 1 is a plan view showing a metal mask for preventing ion exchange and mask openings for performing ion exchange, which can be used to manufacture a plate with lens array according to an embodiment of the present invention.
Figure 2A:
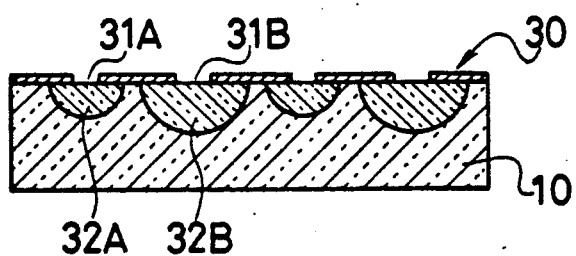
FIG. 2A is a sectional view of the plate with a lens array of this embodiment after ion exchange is completed, corresponding to a section taken along a line 2A—2A of the metal mask shown in FIG. 1.
Figure 2B:
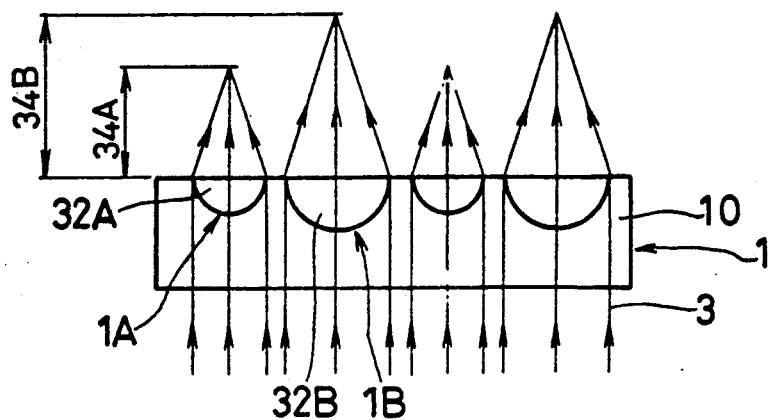
FIG. 2B is a sectional view showing a light refraction state of the plate with the lens array of this embodiment.

FIGS. 1 and 2A show a method of manufacturing a plate with lens array of this embodiment, which has a plurality of small lenses having different focal lengths on a single substrate.

The principle of the manufacturing method of this embodiment is substantially the same as the conventional ion exchange method described above. A difference is that mask openings 31A and 31B having different opening diameters are formed in a metal mask 30 for preventing ion exchange, as shown in FIG. 1. As shown in FIG. 2A, a glass substrate 10 is covered with the metal mask 30, and the above-mentioned ion exchange is performed, so that gradient index regions 32A and 32B are formed in the glass substrate 10. Briefly speaking, the substantially semi-spherical gradient index regions 32A and 32B formed by ion exchange have the shapes whose sizes are increased in similar proportion to the mask opening diameters, as shown in FIG. 2A.

In the lens-array plate 1 prepared as described above, as shown in FIG. 2B, the gradient index regions 32A and 32B having similar shapes are formed, and respectively serve as gradient index lenses 1A and 1B. Light rays 3 incident on the plate with lens array 1 are almost similarly refracted, as shown in FIG. 2B. The focal lengths 34A and 34B of the gradient index lenses 1A and 1B are different from each other. The focal lengths 34A and 34B can have different values according to mask opening diameters. Note that in this embodiment, the plate with lens array is manufactured by the ion exchange method but may be manufactured by another method, e.g., plastic molding or a fresnel lens manufacturing method.

Two application examples which can be realized by using the plate with lens array according to the present invention will be explained below.

An application example shown in FIG. 3 shows a duplication focusing optical system effective for character or pattern recognition, which can be applied to a Fourier analyzer utilizing Fraunhofer diffraction by coherent light.

When character or pattern recognition is optically performed, a large number of duplicated images of an input pattern are simultaneously formed, and separate comparison reference patterns are overlaid on the duplicated images to obtain optical correlation between the duplicated images and the reference patterns, so that the input pattern is compared with the large number of reference patterns in an instant. When pattern recognition is performed by this method, coherent light is used as illumination light, and a large number of real images and Fourier-transformed images of an input pattern are formed at the same time. The different processing operations are performed for these two types of images, thereby improving pattern recognition precision and a degree of freedom in recognition.

FIG. 3 shows an optical system for simultaneously forming a large number of real images and Fourier-transformed images of an input pattern under coherent illumination. This optical system comprises a first plate with lens array 1 in which small lenses 1A and 1B having different focal lengths (focal lengths $f_1$ and $f_1'$) are formed on a single glass substrate 10, a first lens 2 (focal length $f_2$), an input pattern (e.g., letter "A") 4 formed by a transparent object, a second lens 5 (focal length $f_3$), an output surface 6, and a second plate with lens array 7 in which second small lenses 7A (focal length $f_4$) are formed. An optical comparator (not shown) including reference patterns and photodetectors is arranged near the output surface 6. Intervals (spaces) between respective parts are defined by the focal lengths $f_1$, $f_2$, $f_3$ and $f_4$, as shown in FIG. 3. The second plate with lens array 7 has the second small lenses 7A only at positions where light rays 3A passing through the small lenses 1A are incident. The positions where light rays 3B passing through the small lenses 1B comprise a transparent glass plate in the second plate with lens array 7.

When the respective parts are arranged in this manner to constitute an optical system, real images of an input pattern are formed at positions of the output surface 6 corresponding to the light rays 3A, and Fourier-transformed patterns of the input pattern are formed at positions of the output surface 6 corresponding to the light rays 3B. That is, a large number of real images and Fourier-transformed patterns of an input pattern are simultaneously formed on the single plane by a compact single optical system. These patterns can be compared with the reference patterns of the optical comparator to obtain necessary electrical signals from the photodetectors.

In order to constitute the optical system described above, the lens array plate of the present invention, which simultaneously has small lenses having different focal lengths, is highly advantageous. For example, in order to realize this optical system, another arrangement may be proposed. In this arrangement, two types of lenses having different focal lengths are arrayed and fixed on a single plane to attain the same effect as described above. However, such an arrangement is difficult to realize otherwise in terms of the number of assembly steps and positional precision.

As another application example, a surface position/inclination sensor optical system will be explained below.

Figure 4A:
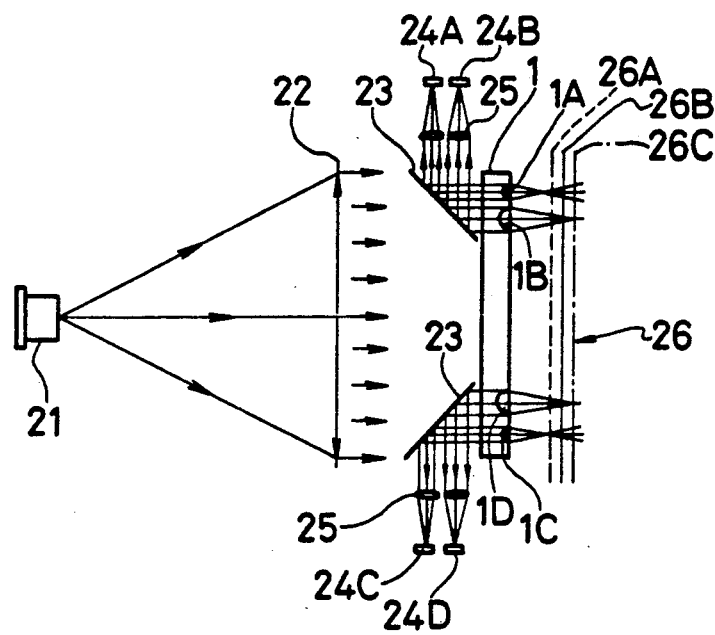
FIG. 4A is a diagram of an optical system as another application example of the plate with the lens array according to the present invention.
Figure 4B:
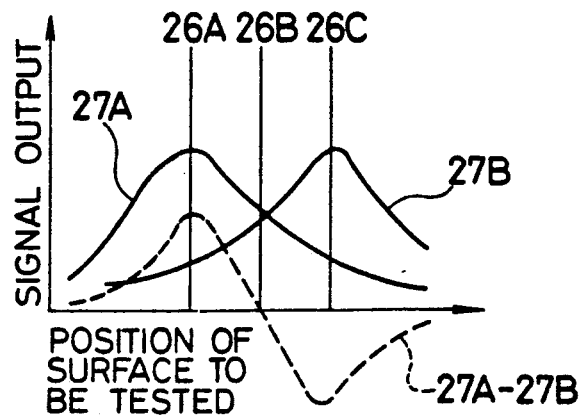
FIG. 4B is a graph showing a signal output from a photosensor of the optical system shown in FIG. 4A.
Figure 5:
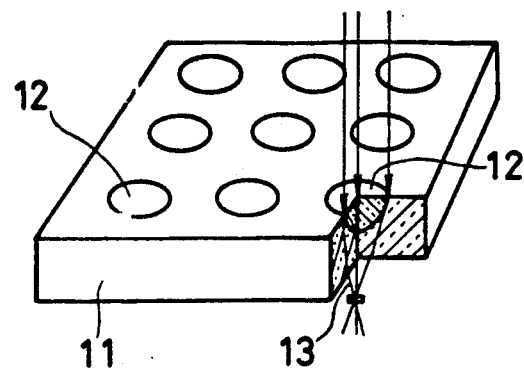
FIG. 5 is a perspective view, with part cutaway for illustrating, of a conventional plate with lens array.

A sensor optical system which can precisely detect a position and inclination of a plane consisting of a mirror surface or a diffusion surface in a non-contact manner can be realized by using the plate with lens array of the present invention. FIG. 4A shows the sensor optical system of this example. According to this sensor optical system, a laser beam emitted from a semiconductor laser 21 is collimated by a collimator lens 22, and the collimated beam is then incident on a plate with lens array 1 of the present invention. Small lenses 1A (focal length $f_1$), 1B (focal length $f_1'$), 1C (focal length $f_1$) and 1D (focal length $f_1'$) are arranged in the plate with lens array 1. The small lenses 1A and 1B and the small lenses 1C and 1D are respectively arranged adjacent to each other. A surface to be tested 26 is located near the focal lengths of the small lenses 1A, 1B, 1C and 1D. Light reflected or scattered by the surface to be tested 26 passes through the small lenses 1A, 1B, 1C and 1D again, is reflected by a beam splitter 23. The light from the small lenses 1A to 1D is then incident on photosensors 24A to 24D through each focusing lens 25, respectively. With the arrangement shown in FIG. 4A, a signal intensity proportional to a light intensity output from each photosensor 24 becomes maximum when the surface to be tested 26 is located at the focal point of each of the small lenses 1A to 1D, and is gradually decreased as the surface 26 is offset from the focal point. Assume that a position where the surface to be tested 26 is located at the position of $f_1$ is represented by a surface position 26A, a position where it is located at the position of $f_1'$ is represented by a surface position 26C, and a position where it is located therebetween is represented by a surface position 26B. In this case, signals 27A and 27B output from the photosensors 24A and 24B change as shown in FIG. 4B with respect to the surface positions 26A and 26C. Therefore, if a difference signal (27A−27B) is obtained by an operational amplifier, position information of the surface to be tested can be obtained, as shown in FIG. 4B. Similarly, a signal representing an inclination of a surface can be obtained by an inclination signal=(27A−27B)−(27C−27D) where 27C and 27D are respectively the output signals of the photosensors 24C and 24D.

In order to constitute the non-contact high-precision surface position/inclination detection optical system with a simple arrangement as described above, the plate with lens array of the present invention, which simultaneously has small lenses having different focal lengths, is very preferable. For example, in order to realize the optical system, another arrangement may be proposed. In this arrangement, two types of lenses having different focal lengths are arrayed and fixed on a single plane to attain the same effect as described above. However, such an arrangement is difficult to realize in terms of the number of assembly steps and positional precision.

When the plate with lens array according to the present invention is used, the optical systems of the above-mentioned application examples which are very difficult to realize by the conventional plate can be easily realized. This specification presents two examples.

However, various other applications which cannot be realized by the conventional plate can be realized by the lens array plate of the present invention.

What is claimed is:

1. A surface position/inclination sensor optical system comprising:

a single laser source for emitting a single laser beam, collimating means for collimating said laser beam, a plate with lens array including a substrate and a plurality of lenses, at least two of which have different focal lengths, said plurality of lenses being integrally arranged in said substrate so as to be linearly or two-dimensionally arrayed, the collimated beam from said collimating means being incident at a right angle on said plate and on said plurality of lenses so as to be focused on a surface to be tested, said surface to be tested being movable or inclinable only to a direction of optical axes of said plurality of lenses, a beam splitting means for splitting the beam which is reflected or scattered on said surface to be tested, the reflected beam passing through said plurality of lenses, focusing means for focusing the splitted beam from said splitting means, and photosensing means for sensing a light intensity of the beam focused thereon through said focusing means, wherein said light intensity derived from one of said plurality of lenses is compared with that derived from the other of said plurality of lenses, thereby obtaining an output signal for an information of position or inclination of said surface to be tested.

2. A surface position/inclination sensor system according to claim 1 wherein said plurality of lenses comprise gradient index lenses formed in said substrate.

3. A surface position/inclination sensor system according to claim 2 wherein said substrate comprises a transparent plate.

4. A surface position/inclination sensor system according to claim 3 wherein gradient index regions are formed in given portions of said transparent plate to form said gradient index lenses.

5. A surface position/inclination sensor system according to claim 4 wherein said gradient index regions have different sizes so that at least two gradient index lenses thereof have different focal lengths.

* * * * *